United States Patent [19]

Stifnell

[11] Patent Number: 5,193,288
[45] Date of Patent: Mar. 16, 1993

[54] APPARATUS AND METHOD FOR MEASURING AUTOMOTIVE DAMAGE AND DISALIGNMENT

[76] Inventor: Luch W. Stifnell, 760 Hill Rd., R.D. #1, Green Lane, Pa. 18054

[21] Appl. No.: 619,148

[22] Filed: Nov. 28, 1990

[51] Int. Cl.<sup>5</sup> .............................................. G01B 5/25
[52] U.S. Cl. ................................... 33/608; 33/645; 33/533; 33/413; 33/DIG. 1
[58] Field of Search ................. 33/608, 600, 645, 533, 33/520, 286, 288, 413, 756, DIG. 1

[56] References Cited

U.S. PATENT DOCUMENTS

| | | | |
|---|---|---|---|
| 2,401,980 | 6/1946 | Smith . | |
| 3,611,575 | 10/1971 | Chartier | 33/520 |
| 3,983,635 | 10/1976 | Jarman | 33/288 |
| 4,302,883 | 12/1981 | MacGregor | 33/180 |
| 4,330,945 | 5/1982 | Eck | 33/288 |
| 4,473,954 | 10/1984 | Vilches | 33/174 |
| 4,507,872 | 4/1985 | Schermann | 33/174 |
| 4,561,187 | 12/1985 | Powell | 33/288 |
| 4,608,760 | 9/1986 | Franks | 33/180 |
| 4,621,435 | 11/1986 | Higginbotham | 33/520 |
| 4,628,414 | 12/1986 | Ricard | 362/61 |
| 4,630,379 | 12/1986 | Wickmann et al. | 33/288 |
| 4,683,663 | 8/1987 | Sarauer | 33/288 |
| 4,689,888 | 9/1987 | Aldrich et al. | 33/288 |
| 4,756,089 | 7/1988 | Danielsson, III | 33/503 |
| 4,771,544 | 9/1988 | Riutta | 33/360 |
| 4,811,250 | 3/1989 | Steber et al. | 364/551 |
| 4,844,609 | 7/1989 | Floyd et al. | 356/154 |
| 4,899,457 | 2/1990 | Fergus et al. | 33/608 |
| 4,958,439 | 9/1990 | Dehn | 33/645 |

Primary Examiner—William A. Cuchlinski, Jr.
Assistant Examiner—William C. Dowling
Attorney, Agent, or Firm—Synnestvedt & Lechner

[57] ABSTRACT

An apparatus for gauging vehicle damage. The invention comprises a plurality of removable magnetic stop members for placement upon a vehicle and for determining a point of reference. Each of the magnetic stops has an axially extending alignment pole and a calibrated measurement chain attached to the pole for making a measurement from the point of reference. In the method of the present invention a point of reference on an automotive body is determined. Next, a portable magnetic stop is placed on the automotive body at the point of reference. Finally, a calibrated chain is extended from the portable magnetic stop for making an auto body measurement from the point of reference.

8 Claims, 5 Drawing Sheets

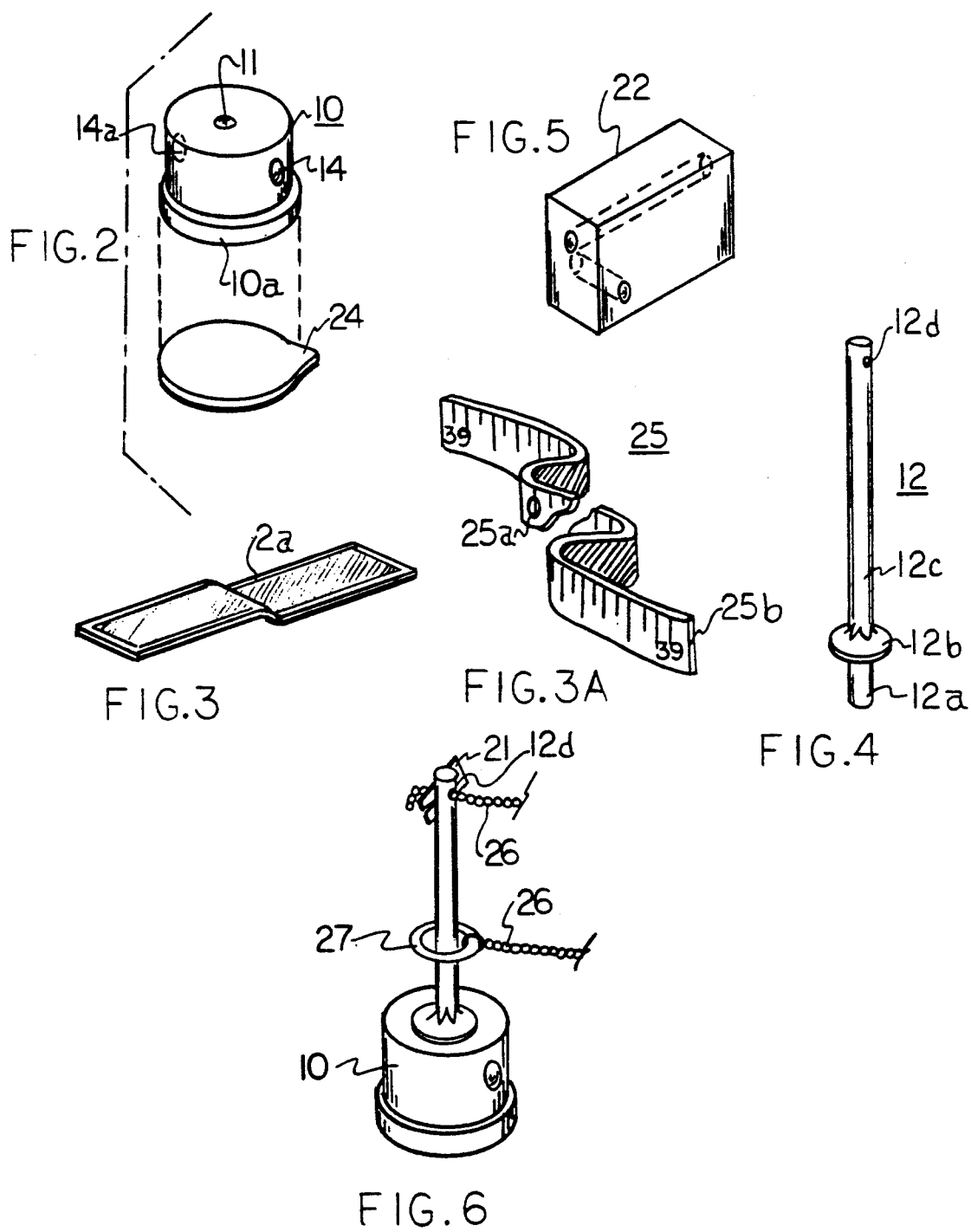

APPARATUS AND METHOD FOR MEASURING AUTOMOTIVE DAMAGE AND DISALIGNMENT

The present invention is directed to methods and apparatus for measuring automotive body damage. In particular, the present invention is directed to mechanical devices and methods for measuring automotive body damage.

BACKGROUND OF THE INVENTION

Each year, tens of thousands of automobiles and trucks are damaged in automotive accidents. The repair of these vehicles is typically performed by one of the approximate 50,000 automotive body shops located throughout the United States and Canada.

A key element in auto body repair is the correct alignment and measurement of the vehicle frame and/or body in order to determine both the extent of damage and the correct alignment necessary for proper repair. At present, there are a number of popular devices and methods for gauging vehicle body and frame disalignment and damage.

U.S. Pat. Nos. 4,683,663; 4,302,883; and 4,899,457 each disclose various vehicle straightening and measurement bridges and frames for gauging autobody repair. These devices are bulky, expensive and must be utilized by trained personnel. U.S. Pat. No. 4,683,663, for example, includes cumbersome position locating arms which are movable along several axes, but which are difficult to position. several axes, but which are difficult to position.

Some prior art devices such as disclosed in U.S. Pat. No. 3,983,635 incorporate sight alignment mechanisms. In U.S. Pat. No. 3,983,635 telescoping tubes suspend from the frame for supporting a pointer. These devices are also complex and relatively difficult to use.

U.S. Pat. No. 4,330,945 utilizes a laser based measurement system. Laser based measurement systems, which have recently gained popularity, are very expensive (often costing over $50,000) and require substantial training by automotive repair personnel.

U.S. Pat. No. 4,811,250 discloses an acoustical system for determining vehicle damage utilizing computerized acoustical measurement. The system includes a data acquisition apparatus comprised of emitters, receivers, and microprocessor controls. The emitters are mounted at various predetermined positions on the body and emit an acoustic burst signal. An array of microphones act as the receiver. A coprocessor initializes an external clock which measures the travel time from the emitter to the receivers. The repetition of the process yields three dimensional coordinates which can be utilized to measure vehicle damage.

Each of the above discussed prior art devices and methods thus utilizes complex, expensive or bulky apparatus for measuring vehicle damage. Such apparatus, while accurate, are often far beyond the financial reach of the small auto body shop and the cost of their purchase and use is a contributing factor to the increased cost of auto body repair. Auto body repair is a substantial component in increasing automotive insurance rates. The use of these devices further increases the cost and time required for estimating auto body damage.

It would be desirable to have a vehicle frame measurement system which is small, inexpensive and which can be easily utilized and moved to determine vehicle damage.

It is thus a principal object of the present invention to provide a vehicle damage measurement system which is small, inexpensive and which can be rapidly utilized to make a significant number of auto body measurements.

It is still a further object of the present invention to provide a vehicle damage measurement apparatus which incorporates a plurality of magnetic measurement stops which can be easily maneuvered to measure a wide variety of relevant vehicle gauges and distances.

These and other objects of the present invention will become readily apparent in view of the following Summary and Detailed Description.

SUMMARY OF THE INVENTION

In accordance with the present invention, an apparatus and method for determining vehicle frame damage and for facilitating the realignment of a damaged motor vehicle are disclosed. The apparatus and method utilize a removable magnetic stop member for placement upon a damaged vehicle and for determining a point of reference on the damaged vehicle frame; and a calibrated measurement chain attached to the removable magnetic stop member for making a vehicle disalignment measurement from said point of reference. The removable magnetic stops can be used with velcro pads when the damaged vehicle does not have a steel roof body. The magnetic nature of the removable stops permits them to attach anywhere on the vehicle frame so as to facilitate measurement of vehicle windows, doors, hoods, etc. The present invention provides a fast and inexpensive alternative to state of the art methods of measuring vehicle damage such as those incorporating lasers and acoustics.

BRIEF DESCRIPTION OF THE FIGURES

FIG. 2 is an exploded view of the magnetic stop of the present invention including rubber protective pad.

FIG. 3 is a velcro-adhesive pad which enables the present invention to be utilized on a non-metallic auto body surface.

FIG. 3A is a magnetic tape measure utilized for making a center line and other relevant measurements on the vehicle.

FIG. 4 is an axially extending alignment pole which is utilized with the magnetic measurement stop of the present invention.

FIG. 5 is a support block which is used in conjunction with the radial expanding extension poles of the present invention.

FIG. 6 is a partially perspective view of the magnetic stop of the present invention with alignment pole and measurement chain.

DETAILED DESCRIPTION OF THE PREFERRED EMBODIMENT

Figures 6A, 7:
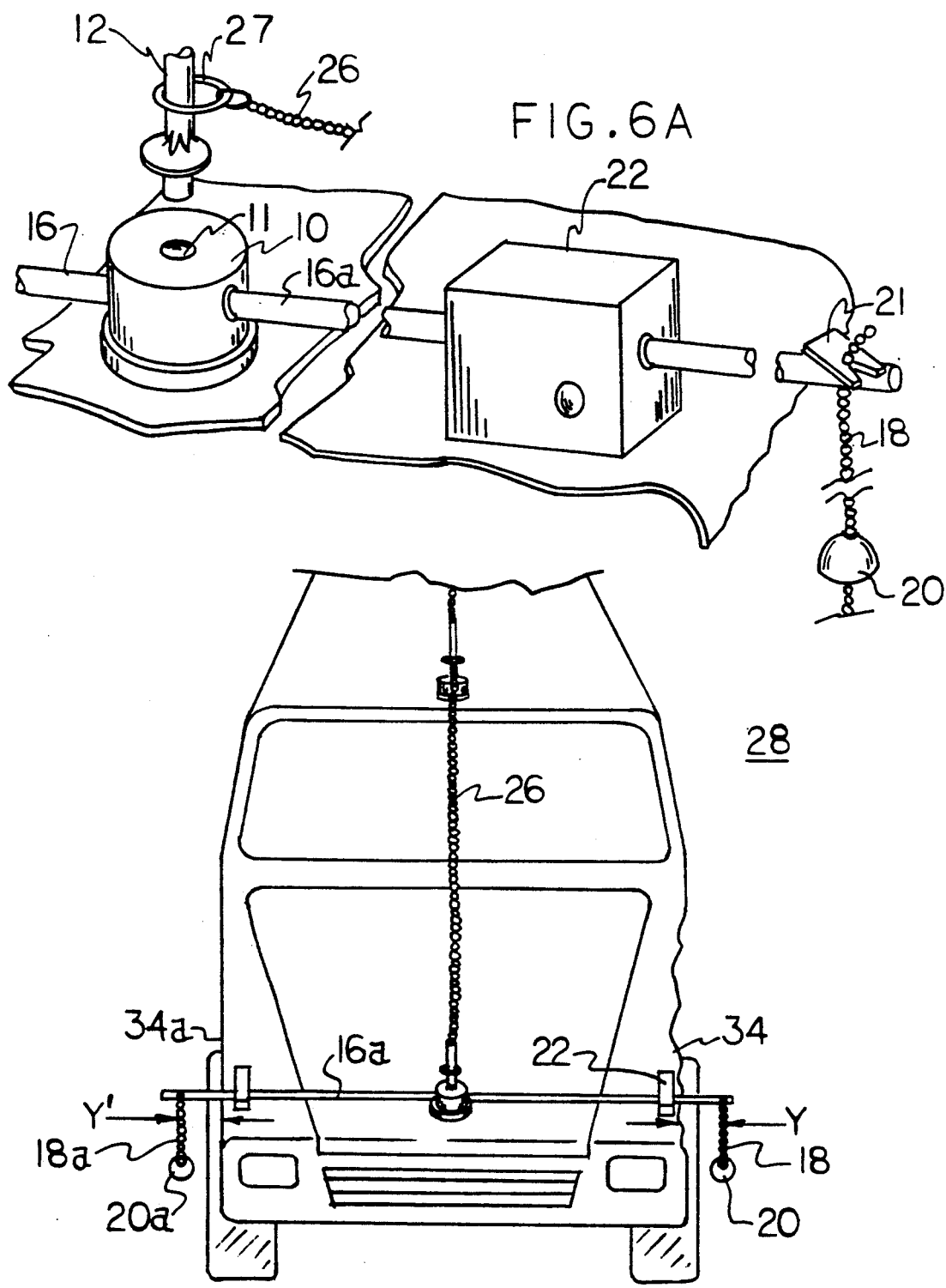
FIG. 6A is a partially exploded view of the magnetic stop and support block of the present invention as utilized for measuring side body damage.
FIG. 7 is a front elevational view of the damage measurement apparatus of the present invention as utilized to gauge side body damage.

The apparatus and method for measuring automotive body damage of the present invention is described with reference to the attached Figures wherein the same numbers are utilized where applicable. Referring to FIGS. 1-6A, the damage measurement system of the present invention is disclosed. The measurement apparatus comprises an aluminum, steel or other metallic disk shaped member 10. The disk shaped member 10 includes a centrally located axial aperture 11 through which a vertical aluminum, steel or other metallic alignment rod or pole 12 extends. Referring to FIGS. 4 and 6, alignment rod 12 comprises a plug end 12a, collar 12b and shaft portion 12c. The plug end 12a is placed within the axial aperture 11 of disk 10 and supported by the collar 12b. The shaft portion 12c contains an aperture 12d at its distal end which supports an alignment chains 26 to be discussed in greater detail below.

Referring to FIGS. 2 and 6A, the aluminum or steel disk-shaped member 10 further includes two radial apertures 14, 14a which support one or more support rods 16, 16a. Rods 16, 16a extend radially outward from apertures 14, 14a and support, at their respective far ends, calibrated chains 18, 18a and plumb weights 20, 20a. As with alignment poles or rods 12, the radial support rods 16, 16a include apertures from Which to suspend the calibrated chains 18, 18a and plumb weights 20, 20a. The chains are supported by clips 21. As shown in FIGS. 5 and 6A, the apparatus also utilizes a multi-apertured support block 22 which maintains support rods 16, 16a in a horizontal position. The multiple apertures 22a of support block 22 facilitate the use of the present invention with vehicles having different roof and hood shapes and inclinations. The calibrated chains 18, 18a preferably are calibrated in inches and feet or, alternatively, may be calibrated utilizing the metric system.

The aluminum or steel disk-shaped member 10 has a magnetic bottom 10a which is designed to adhere to the steel body of a motor vehicle. As shown in FIG. 2, the disk 10 is preferably utilized in conjunction with a rubber or thin polymer pad 24 which prevents the disk 10 from scratching the vehicle's body when placed thereon. As shown in FIG. 3, the system should also include an adhesive or velcro flap 29 which can be used to affix stop member 10 to the vehicle body when the body of the vehicle is not constructed from steel, such as the fiberglass Chevrolet Corvette Stingray.

Referring to FIG. 3A, the present invention also includes the use of a magnetic measuring tape 25 which, as will be discussed below, is utilized to measure the center line and other reference points of the vehicle 28. The measuring tape 25 preferably should be constructed so as to have a central zero position 25a and to extend at least 39 inches in either direction 25b. This length is sufficient to measure the center line of the widest vehicles and trucks.

Referring to FIG. 6, the axially extending alignment poles or rods 12 are attached to one or more calibrated measurement chains 26. The chains 26 are affixed alternately to a ring 27 which slides on the rod 12 or to aperture 12d via a clip 21. The chains 26 are calibrated to measure the distance from the rod to a point on the vehicle. As with chains 18, 18a, chains 26 may be calibrated using either the English or metric system.

Figure 1:
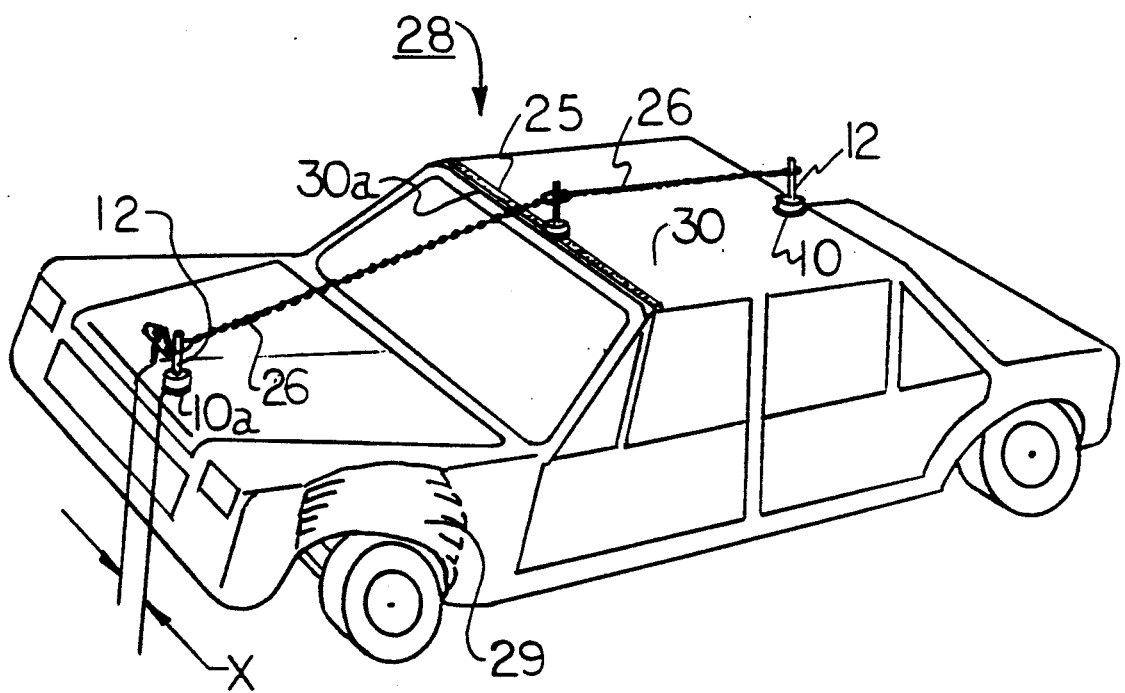
FIG. 1 is an elevated perspective view of the magnetic measurement stops of the present invention as applied to measure the center line and hood of a vehicle.
Figure 8:
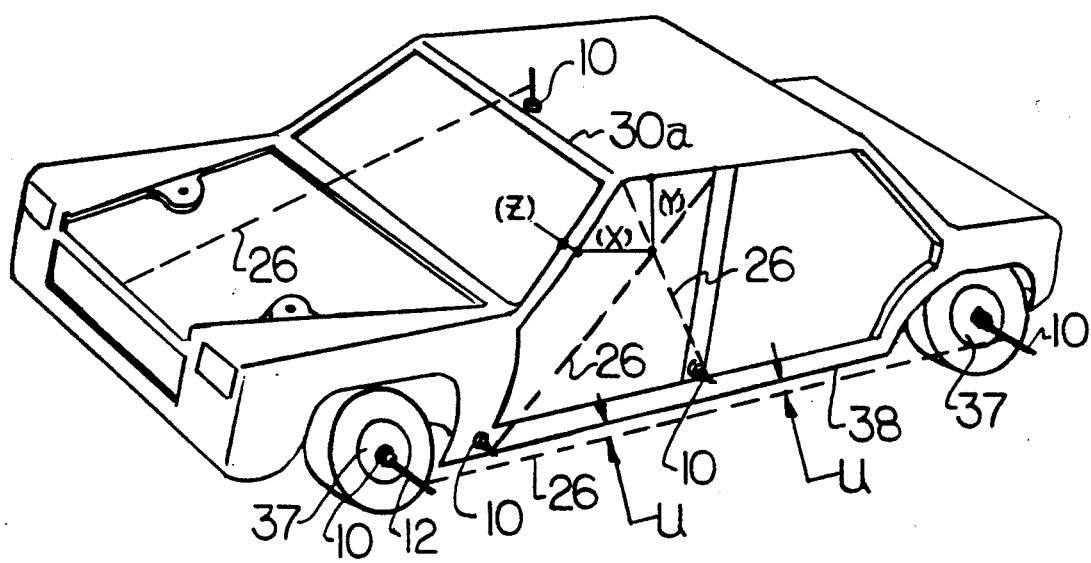
FIGS. 8–10 illustrate the use of apparatus of the present invention as utilized in making a variety of body measurements.

Referring to FIGS. 1, 7-10, the operation of the measurement apparatus and method of the present invention is now described. FIG. 1 illustrates the operation of the vehicle measurement apparatus to gauge vehicle front end frame offset caused by a front left side collision. In this example, the center line of the front end and hood of vehicle 28 has been offset by a front side collision 29. In order to measure the level of disalignment, the center line of vehicle 28 is initially determined. This determination is made by first measuring the center of the roof 30 using measuring tape 25. Next, magnetic stops 10 with axial alignment poles 12 and calibrated chains 26 are placed along the center line of the roof 30 of vehicle 28 as determined by tape 25. As shown, the roof 30 should be measured from at least two locations, one of which should be the front of the roof 30a. After the center line of the roof 30 of vehicle 28 is determined, the true center of the hood is determined by visually aligning the calibrated chain 26 with the center line of the roof. This may be performed by aligning the alignment poles 12 on the two roof points with the pole 12 on a third disk 10a located at the front of the vehicle. The determination of this point provides the distance "X" required for front end realignment. Alternatively, as shown in FIG. 8, this determination can be made without the use of the pole 12 of a third magnetic stop 10a.

Referring to FIG. 7, the vehicle measurement system of the present invention may also be utilized to determine side vehicle damage. FIG. 7 illustrates vehicle 28 with front left body damage 34. In utilizing the present invention for gauging this type of damage, the measurement tape 25 is first used to determine the center line of the vehicle from hood 32. As above, the center line preferably should be determined from two points. Disk 10 is then placed at the center of the hood as measured by tape 25. Next, radially extending rods 16, 16a are extended over side of vehicle 28. The rods are held horizontal by blocks 22. Calibrated chains 18, 18a and plumb weights 20, 20a are then extended over both the damaged and undamaged sides of the vehicle. Initially, the distance Y between the chain 18a and undamaged fender 34a is measured. Next, the distance Y' between chain 18 and damaged fender 34 is measured. The variance between distances Y and Y' provides the level of disalignment.

Figure 9:
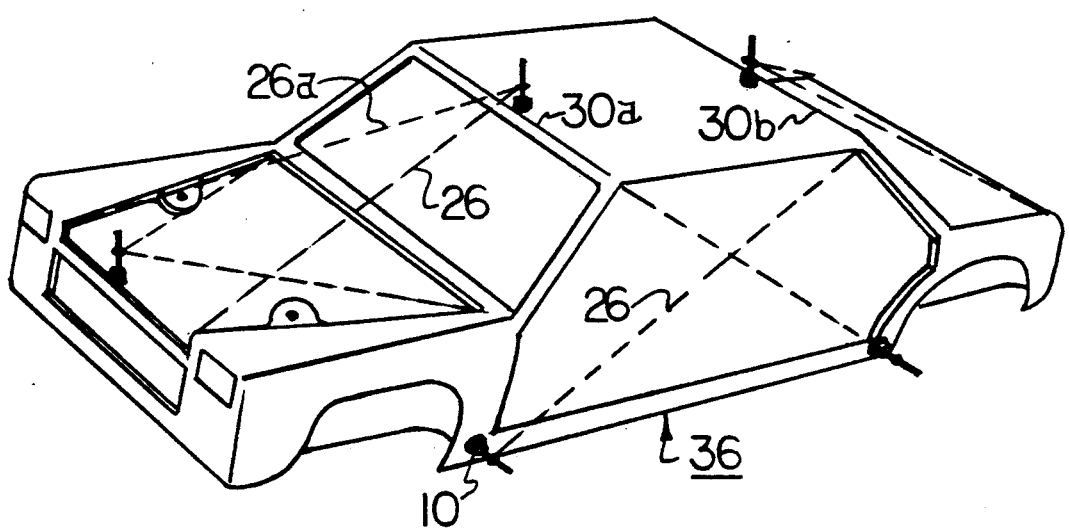
Figure 10:
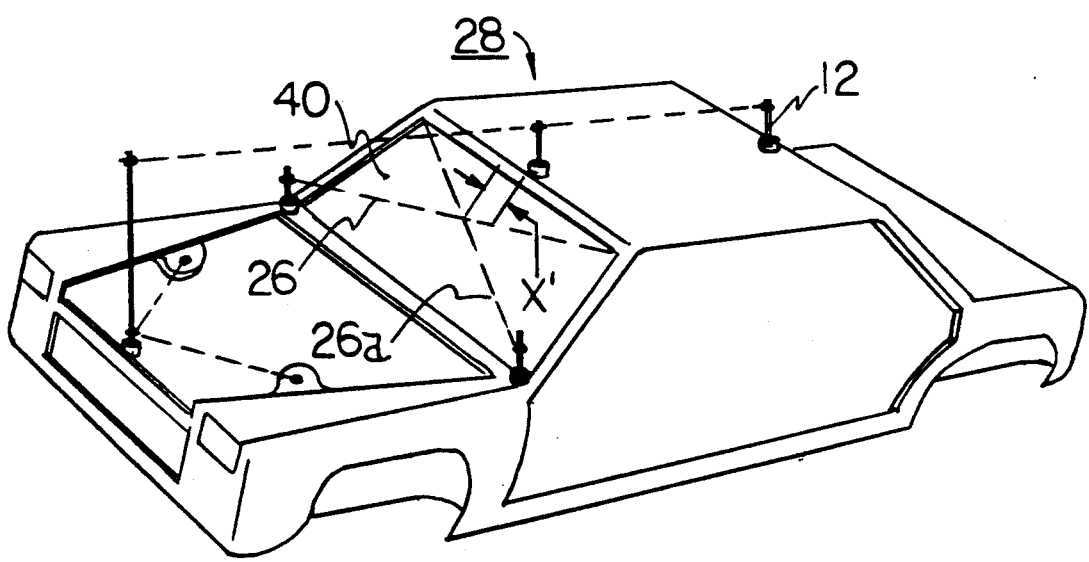

FIGS. 8, 9 and 10 illustrate additional examples of the types of auto body measurements which can be rapidly performed utilizing the magnetic measurement apparatus of the present invention. Referring to FIG. 8, by utilizing two of the removable magnetic stops 10 with calibrated chains 26, the extent of door disalignment can be readily determined. In this example, two stops 10 are placed at opposite ends of a damaged front left door. Chains 26 are then extended to opposite sides of the door to create an "X". The respective vertical (y) and horizontal (x) coordinates of the "X" are measured relative to an undamaged reference point on the vehicle (z). The corresponding vertical (y) and horizontal (x) coordinates of the undamaged side are then measured and compared to the opposite point (z). By determining the difference in the respective x and y coordinates between the damaged and undamaged sides, the degree of door disalignment is determined. FIG. 9 illustrates a similar example 36 which gauges both doors.

As further shown in FIG. 8, the magnetic stops 10 can also be placed on the front and rear vehicle hubs to facilitate measurement of lower frame disalignment. In this example, calibrated chain 26 is held rigid between two stops 10 magnetically affixed to hub 37 and a plurality of measurements (u) can be made between the rigid chain 26 and lower vehicle frame 38.

FIG. 9 illustrates the use of the vehicle measurement system of the present invention to gauge front and rear fender disalignment. In this example, the center line of the roof is initially determined in the manner discussed above with respect to FIG. 1. Next, removable magnetic stop 10 is place at either the front end or rear end of the roof 30a, 30b. Two calibrated chains 26, 26a are then extended to the respective damaged and undamaged fenders. The difference in the measured distances of the respective chains provides the degree of fender disalignment. FIGS. 9 and 10 similarly illustrate an example in which hood disalignment is determined from a centrally located magnetic stop 10 situated on the front end of the vehicle frame.

Finally, FIG. 10 illustrates the use of magnetic measurement system of the present invention stops to measure windshield disalignment. As shown, magnetic stops 10 are placed on opposite sides of the vehicle windshield 40. The calibrated chains are 26, 26a then extended to opposite corners to form an "X." The horizontal intersection of the "X" is then compared with the center line of the vehicle as determined from magnetic stop 10a. The horizontal variance between the intersection X and the center line of the vehicle, (X') as measured from the vehicle roof, provides the degree of windshield disalignment. As shown and described, the system of the present invention can be rapidly utilized to make a wide variety of vehicle body measurements.

The present invention has been described with reference to the above described preferred embodiments. It is to be understood that the true nature and scope of the present invention is to be determined with respect to the claims appended hereto.

What is claimed is:

1. An apparatus for gauging vehicle damage comprising:
    removable magnetic stop means for placement upon an undamaged portion of a damaged vehicle and for determining a point of reference on said damaged vehicle; and
    a calibrated measurement chain attached to said removable magnetic stop means for making a vehicle disalignment measurement by determining the distance from a point of damage on said damaged vehicle and a point on the vehicle extending from said point reference.

2. An apparatus for gauging vehicle damage comprising:
    a plurality of removable magnetic stop members for placement upon a damaged vehicle and for determining a frame of reference on said damaged vehicle, each of said magnetic stop members having an axially extending alignment pole for properly aligning said frame of reference; and
    a calibrated measurement chain attached to at least one of said axial alignment poles for making a disalignment measurement by determining a distance between a point on said vehicle extending from said aligned frame of reference and a point of vehicle damage.

3. The apparatus of claim 2 further comprising a second alignment pole extending from at least one of said removable magnetic stop members for creating a second point of reference, and a second measurement chain extending from said second alignment pole for making a disalignment measurement from said second point of reference.

4. The apparatus of claim 2 wherein said removable magnetic stop member further comprises a pad which prevents said stop member from scratching the body of said vehicle.

5. The apparatus of claim 2 wherein said removable magnetic stop member is disk-shaped.

6. The apparatus of claim 5 wherein said removable magnetic stop member is constructed from a metal.

7. The apparatus of claim 6 wherein said metal is aluminum.

8. An apparatus for gauging vehicle damage comprising:
    a plurality of removable disk-shaped magnetic stop members for placement upon the undamaged portion of a vehicle and for determining a point of reference, each of said magnetic having an axial alignment pole for aligning said point of reference; and
    a calibrated measurement chain attached to least one of said axial alignment poles for making a measurement of vehicle disalignment from said point of reference by measuring the distance from a point of vehicle damage to an undamaged point on said vehicle extending from said point of reference.

* * * * *